United States Patent
Sparber et al.

(10) Patent No.: US 6,386,803 B1
(45) Date of Patent: May 14, 2002

(54) DRILL FOR INEXPERIENCED USERS

(75) Inventors: Richard Sparber, Wheaton; Paul E. Maass, Naperville, both of IL (US)

(73) Assignee: DuPage Children's Museum, Naperville, IL (US)

( * ) Notice: Subject to any disclaimer, the term of this patent is extended or adjusted under 35 U.S.C. 154(b) by 0 days.

(21) Appl. No.: 09/615,215

(22) Filed: Jul. 13, 2000

(51) Int. Cl.[7] ................................. B23B 45/06
(52) U.S. Cl. .................. 408/102; 408/137; 408/234; 434/219; 434/260
(58) Field of Search ................ 408/234, 102, 408/110, 130, 137, 138, 710, 101; 434/219, 258, 260

(56) References Cited

U.S. PATENT DOCUMENTS

| | | | | |
|---|---|---|---|---|
| 784,301 A | * | 3/1905 | Carll | 408/137 |
| 2,471,208 A | * | 5/1949 | Gay | 408/137 |
| 3,313,315 A | * | 4/1967 | Rothwell | 408/138 |
| 4,082,473 A | * | 4/1978 | Bratsos | 408/101 |
| 4,132,497 A | * | 1/1979 | Weller et al. | 408/710 |
| 4,861,206 A | * | 8/1989 | Riedel | 411/36 |

* cited by examiner

Primary Examiner—Daniel W. Howell

(57) ABSTRACT

A drill (100) for drilling a material (104) with a drill bit (102) which is specially adapted for use by inexperienced users is provided. The drill (100) includes a rotatable helix screw (132) having a helix groove (134). A support block (136) travels up and down the helix screw (132) when the helix screw (132) is rotated via a handle section (120). A key pin (138) is mounted in the support block (136) to ride in the helix groove (134). Preferably, the center of mass of the support block (136) is tangential to the helix screw (132). A short level section (304) is formed in the bottom of the helix groove (134) such that the key pin (138) rests in the level section (304) when not in use. The drill (100) may comprise an overhead support mechanism (108) for rotatably supporting the drill (100).

18 Claims, 3 Drawing Sheets

DRILL FOR INEXPERIENCED USERS

BACKGROUND OF THE INVENTION

The present invention relates to a drill for drilling holes into material which is used as a teaching tool for children and which reduces risks associated with its operation by an inexperienced user, such as a child.

This section is intended to introduce the reader to various aspects of art that may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Children's museums and the like frequently include exhibits designed to teach children how things work and how to use different devices. Many of the popular exhibits are related to tools which are typically used only by adults. One such tool is the drill for drilling holes into materials. In these exhibits, the drills need to be designed to reduce risks associated with its operation, due to the inexperience of the potential operator, and to teach the operator how the drill operates or functions.

Some of the concerns regarding the children operating drills are the potential for the child to drill into unauthorized items, to injure other children or to injure themselves. Various devices have been developed to reduce the risk of injury to adult users of drills. For example, U.S. Pat. No. 5,908,272 entitled "Rotational Cutting Tool Guard Apparatus" issued on Jun. 1, 1999 discloses compressible, spring-like guard which surrounds the drill bit. As the drill bit burrows into the material being drilled, the guard compresses, thus permitting the drill bit to burrow deeper. Various other devices have been developed which protect against individuals contacting the drill bit while the drill is being operated.

Although contacting the rotating drill bit is a concern for a drill operated by a child, there are additional concerns due to the inexperience of the user. For example, there is the concern that a child will drop the drill. There is also the chance the child would drill into inappropriate materials or things. A child would also need assistance in guiding the drill bit. In addition, the child may need to have the depth of the drilling operation restricted to a predetermined depth.

Accordingly, there is a need for a drill for drilling materials with a drill bit which is supported substantially perpendicularly over the materials, which has limited upward and downward movement, which reduces the likelihood of direct contact with the drill bit, which is balanced and which is relatively facilely drilled into and out of the materials.

SUMMARY OF THE INVENTION

This need is met by a drill in accordance with the present invention in which the drill includes a helix screw for locking the drill and an overhead support mechanism for supporting the drill.

In accordance with one aspect of the present invention, a drill having a drill bit for drilling material includes a helix screw having a helix groove therein and rotatably connected to the the drill bit. A support block interacts with the helix groove to retract the drill bit from the material when the helix screw is rotated in an appropriate direction. A key pin in the support block travels in the helix groove to support the support block. The helix groove may include a short level section in which the key pin is position when the drill is locked. Preferably, a center of mass of the support block is substantially tangential to the helix screw at the key pin.

In accordance with another aspect of the present invention, a drill having a drill bit for drilling into a material comprises a support mechanism for supporting the drill bit and a helix screw having a helix groove therein and rotatably connected to the support mechanism. A support block travels along the helix groove such that when the helix groove is rotated the drill bit is moved translationally.

These and other features and advantages of the present invention will become apparent from the following detailed description, the accompanying drawings and the appended claims.

DESCRIPTION OF THE DRAWINGS

The foregoing and other advantages of the invention will become apparent upon reading the following detailed description and upon reference to the drawings in which.

DETAILED DESCRIPTION OF THE INVENTION

Figure 1:
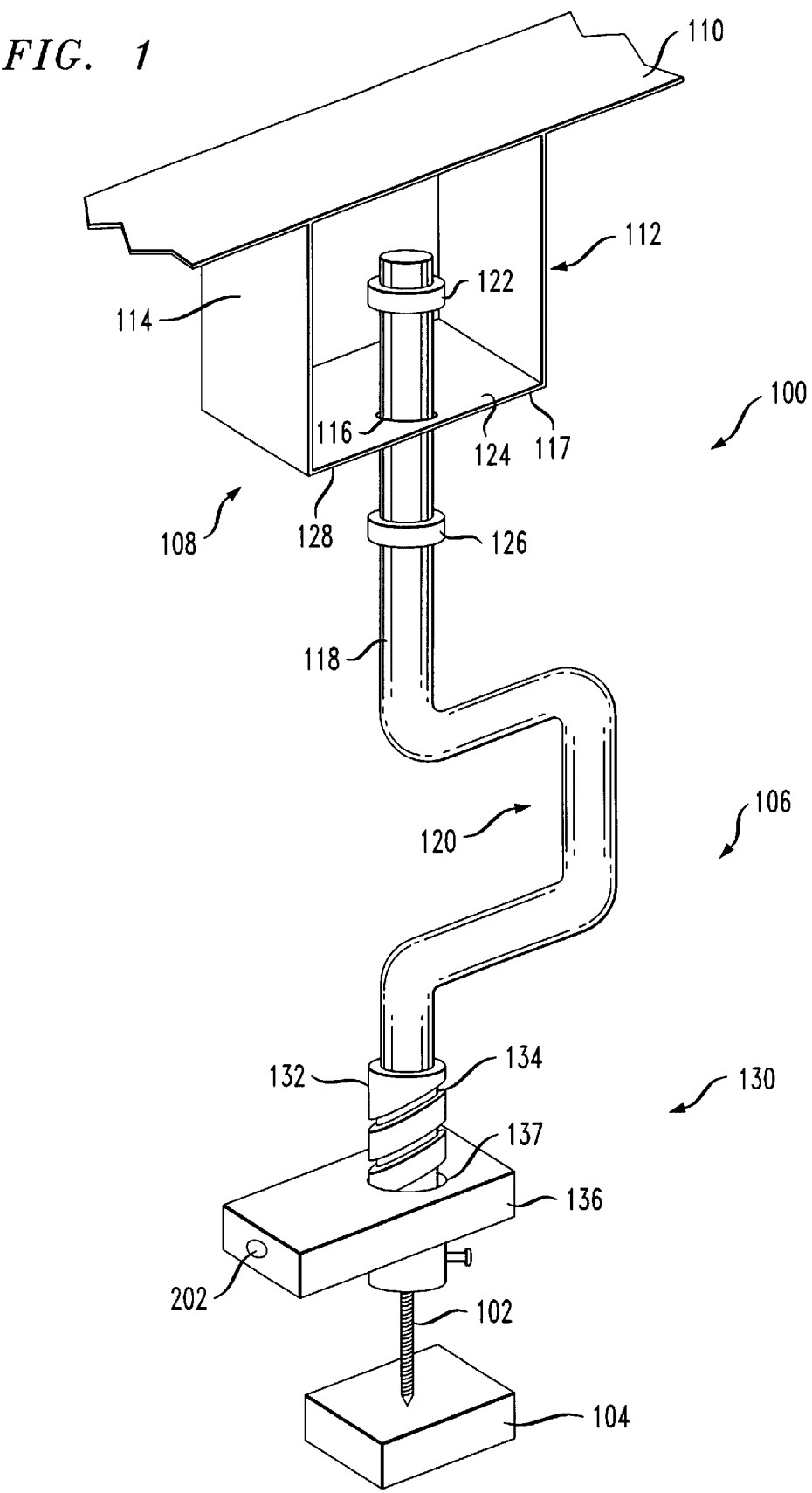
FIG. 1 is plan view of a drill in accordance with the present invention comprising an overhead support mechanism, a drill retraction mechanism and a helix screw.

A plan view of a drill 100 in accordance with the present invention is shown in FIG. 1. The drill 100 has a drill bit 102 for drilling into material, shown for example as a block 104, which may be placed on a work bench or other appropriate surface. A drill assembly, generally designated by reference numeral 106, rotates the drill bit 102. The drill assembly 106 is rotatably supported by an overhead support mechanism 108. The overhead support mechanism 108 preferably permits movement of the drill perpendicular to the material 104. The overhead support mechanism 108 is attached to a mounting surface 110 via a guide assembly 112. The overhead support mechanism 108 is preferably fastened to the mounting surface 110 substantially above the drill bit 102.

The guide assembly 112 includes a mounting frame 114 connected to a guide 116. The guide 116 is shown as a hole in a bottom plate 117 of the mounting frame 114. The guide 116 encloses, and permits translational and rotational movement of, a rod 118. The narrow thickness of the bottom plate 117 also permits a gimble type movement of the rod 118. Thus, the drill 100 may be moved in a number of different manners without breaking or bending the rod 118.

The rod 118 may have any cross sectional pattern appropriate to permit translational and rotational movement. The rod 118 is bent into a handle section 120 for rotating the drill bit 102. As those skilled in the art will readily comprehend, the handle section 120 may take many other forms and may be a separately formed piece attached to the rod 118.

The rod 118 includes a lower stop 122 for limiting movement of the drill bit 102 toward the material 104. The lower stop 122 may be a separate device attached to the rod 118 or may be a raised area formed into the rod 118 which contacts an upper surface 124 of the bottom plate 117 when the drill bit 102 is lowered a certain distance. For increased flexibility, the lower stop 122 may be moveable on the rod 118 so that the lowering distance of the drill bit 102 can be adjusted. The lower stop 122 may then consist of a collar ring with a set screw or the like. The lower stop 122 may be set to prohibit the drill bit 102 from lowering through the material 104 and into contact with, for example, a bench top.

An upper stop 126 is similarly mounted on the rod 118 to limit upward movement of the drill bit 102 away from the material 104. As with the lower stop 122, the upper stop 126 may be formed into the rod 118 or may be a moveable separate piece, such as a collar ring. The upper stop 126 contacts a lower surface 128 of the plate 117 when the drill bit 102 is raised a certain distance. The upper stop 126 may be advantageously set to reduce the likelihood of an inexperienced operator placing inappropriate objects against the tip of the drill bit 102. The guide 116, the mounting plate 114, the lower stop 122, the upper stop 126 and the rod 118 comprise a translation mechanism for permitting movement of the drill bit 102 generally away from and generally toward the material 104.

In operation, an operator turns the handle section 120 to rotate the rod 118, the drill assembly 106 and the drill bit 102. The rod 118, the handle section 120 and the drill assembly 106 comprise a drill rotate mechanism which is rotatably connected to the overhead support mechanism 108 and which rotates the drill bit 102.

Figure 4:
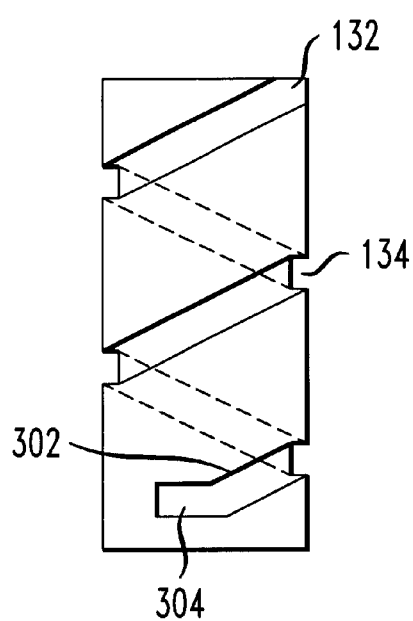
FIG. 4 is a detailed drawing of the helix screw shown in FIG. 1.

A bit retract assembly 130 may be used to retract the drill bit 102 from the material 104 and to place the drill bit 102 against the material 104 before drilling, as described more fully below. A helix screw 132 is connect to a lower portion of the handle section 120 to rotate with the handle section 120. A helix groove 134 is formed in the helix screw 132. The helix groove 134 has a generally square cross sectional area. The helix groove 134 may be; for example, 0.1 inches deep and have a pitch of 1 inch. As shown in more detail in FIG. 4, a lower end 302 of the helix groove 134 is finished with a short level section 304, which may be about 0.4 inches long.

A support block 136 includes a hole 137 in which the helix screw 132 is positioned. As shown in more detail in FIGS. 2, 3A and 3B, the support block 136 interacts with the helix groove 134 such that the support block 136 tends to move when the helix screw 132 is rotated. The support block 136 preferably includes a key pin 138 which travels in the helix groove 134 as the helix screw 132 is rotated. Preferably, the key pin 138 is fabricated from a relatively soft metal so that excessive force will cause the pin 138 to shear which protects the helix 132.

The pin 138 is positioned in a cavity 140 formed in the block 136. To reduce binding, the center of mass of the support block 136 may preferably be tangential to the helix screw 132 at pin 138. Therefore, the hole 137 in the block 132 is positioned to provide such a center of mass.

Figure 2:
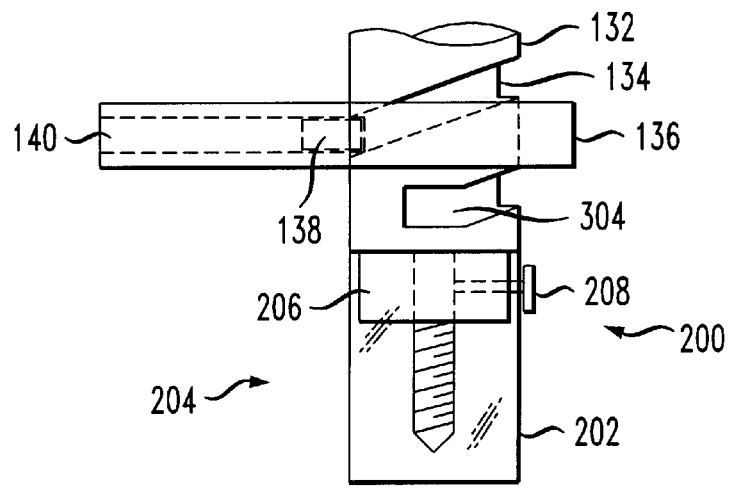
FIG. 2 is a detailed drawing of the drill retraction mechanism shown in FIG. 1.
Figure 3A:
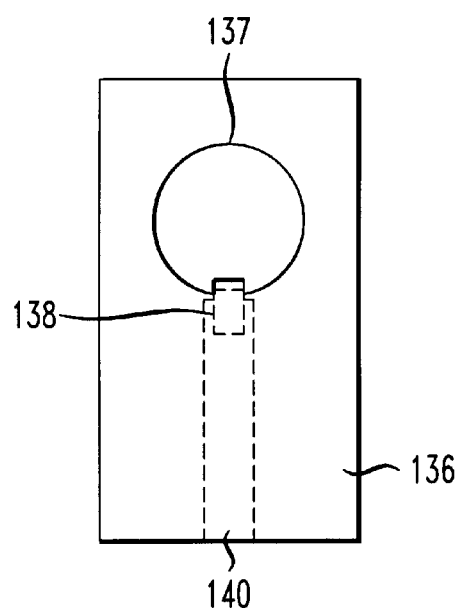
FIG. 3A is a top view of a support block of the drill retraction mechanism shown in FIG. 2.
Figure 3B:
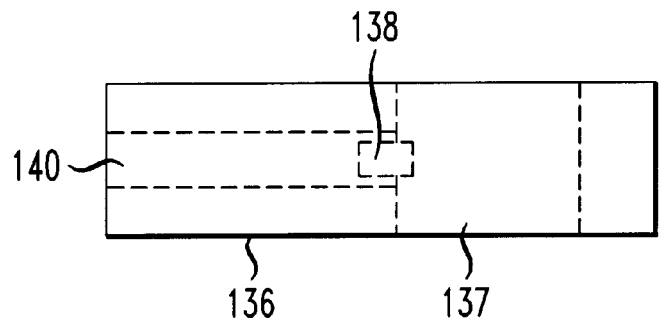
FIG. 3B is a side view of the support block of the drill retraction mechanism shown in FIG. 2.

A drill bit holder 200 of the drill assembly 106 is shown in detail in FIG. 2. The drill bit holder 200 comprises a bit shield 202 which encloses the drill bit 102 and permits observation of the drill bit 102 while drilling while reducing the opportunity to suffer injury by contacting the rotating drill bit 102. The bit shield 202 may extend slightly beyond the tip of the drill bit 102. The bit shield 202 preferably moves substantially with the support block 136 to permit the drill bit 102 to drill into the material 104. As described more filly below, as the helix screw 132 is rotated in the appropriate direction and the support block 136 is held in place, the helix screw 132, and the drill bit 102, moves downward into the material 104. The support block 136 accordingly moves up the helix screw 132. Since the bit shield 202 moves with the support block 136, it too moves up as the drill bit 102 drills into the material 104. Conversely, when the drill bit 102 is being retracted from the material 104, the support block 136, and the bit shield 202, travel down the helix screw 132. In this manner, substantially all of the drill bit 102 is enclosed by the bit shield 202 during the drilling operation.

Preferably the bit shield 202 is manufactured of a substantially transparent material or, alternatively, it may be an opaque material with slots, or windows. The bit shield 202 may be attached to the support block 136 in any appropriate manner, such as by a suitable glue or screw. A bit retainer mechanism 204 comprising a bit holding block 206 and a bit key 208 holds the drill bit 102 in place for the drilling operation. The bit key 208 is tightened to hold the drill bit 102 in place in a known manner.

Operation of the drill 100 will now be described with reference to the figures. When not in operation, the weight of the block 136 forces the block 136 down the helix groove 134 until the key pin 138 rests in the short level section 304. When operated, the bit shield 202 is placed on the material 104 to be drilled. The bit shield 202 perferably prevents the drill bit 102 from touching a work bench when the material 104 is not present when the drill 100 is in the locked position, or the pin 138 is in the short level section 304.

The user places the material 104 down on the bench and lowers the bit shield 202 down on the material 104. The user holds the support block 136 stationary while turning the handle section 120 to cause the drill bit 102 to drill into the material 104. The user continues turning the handle section 120 while holding the support block 136 until the pin 138 moves out of the short level section 304. This unlocks the bit shield 202. The user then releases the support block 136 and holds the material 104. The user then continues to turn the handle section 120 until the drilling operation is completed.

After completing the drilling operation, the user will next retract the drill bit 102 from the material 104. First, the user again holds the support block 136 stationary. The handle section 120 is turned in the direction opposite of the drilling direction. The drill bit 102 is thereby retracted from the material 104 as the the support block 136, and in particular the pin 138, rides down the helix groove 134. When the drill bit 102 is retracted out of the material 104, the drill 100 may be lifted off of the material 104. The user then releases the support block 136. Advantageously, if the pin 138 is not resting in the short level section 304 when the support block 136 is released, the weight of the block 136 will cause the pin 138 to spin down the helix groove 134 until the pin 138 rests in the short level section 304. Thus, the bit shield 202 is again locked in a down position.

As noted above, the upward or downward movement of the rod 118 is limited by the respective upper stop 126 or lower stop 122 contacting the plate 117. Thus, the placement of the lower and upper stops 122 and 126 determine respectively the maximum drilling depth of the drill bit 104 and the maximum distance the drill bit 102 can be raised above the material 104. This feature of the present invention is particularly helpful in reducing risk of injury with unskilled or minor users.

While the invention may be susceptible to various modifications and alternative forms, specific embodiments have been shown by way of example in the drawings and have been described in detail herein. For example, the support block 136 may have different forms to provide an improved gripping area. However, it should be understood that the invention is not intended to be limited to the particular forms disclosed. Rather, the invention is to cover all modification, equivalents and alternatives falling within the spirit and scope of the invention as defined by the following appended claims.

What is claimed is:

1. A drill having a drill bit for drilling material and comprising:
    a helix screw having a helix groove therein and rotatably connected to the drill bit;
    a support block which interacts with the helix groove to retract the drill bit from the material when the helix screw is rotated; and
    a key pin in the support block, which key pin travels in the helix groove to support the support block.

2. A drill having a drill bit for drilling into a material and comprising:
    a support mechanism for supporting the drill bit, wherein the support mechanism comprises:
        a guide connected to a support surface substantially above the drill bit;
        a rod movably supported by the guide;
        a lower stop which limits movement of the drill bit generally toward the material; and
        an upper stop which limits movement of the drill bit generally away from the material;
    a helix screw having a helix groove therein and rotatably connected to the support mechanism; and
    a support block traveling along the helix groove such that when the helix groove is rotated the drill bit is moved translationally.

3. The drill as recited in claim 1 wherein the helix groove comprises:
    a short level section in which the key pin is position when the drill is locked.

4. The drill as recited in claim 1 wherein a center of mass of the support block is substantially tangential to the helix screw at the key pin.

5. The drill as recited in claim 1 wherein the drill assembly comprises:
    a bit shield for enclosing the drill bit and for permitting observation of the drill bit.

6. The drill as recited in claim 1, further comprising a substantially transparent bit shield that surrounds the drill bit and is arranged and constructed to recede as the drill bit drills into the material.

7. A drill having a drill bit for drilling material and comprising:
    a helix screw having a helix groove therein and rotatably connected to the drill bit;
    a support block which interacts with the helix groove to retract the drill bit from the material when the helix screw is rotated;
    an overhead support mechanism for rotatably supporting the drill assembly.

8. The drill as recited in claim 7 wherein the overhead support mechanism is fastened to a mounting surface substantially above the drill bit.

9. The drill as recited in claim 8 wherein the overhead support mechanism comprises:
    a translation mechanism for permitting translational movement of the drill bit.

10. The drill as recited in claim 9 wherein the translation mechanism comprises:
    a lower stop which limits movement of the drill bit toward the material.

11. The drill as recited in claim 9 wherein the translation mechanism comprises:
    an upper stop which limits movement of the drill bit away from the material.

12. The drill as recited in claim 9 wherein the overhead support mechanism comprises:
    a guide connected to the mounting surface, and wherein the translation mechanism comprises a rod moveably supported by the guide and attached to the drill assembly.

13. The drill as recited in claim 9 wherein the drill assembly comprises:
    a drill rotate mechanism rotatably connected to the overhead support mechanism for manually rotating the drill bit.

14. A drill having a drill bit for drilling into a material and comprising:
    a support mechanism for supporting the drill bit;
    a helix screw having a helix groove therein and rotatably connected to the support mechanism;
    a support block traveling along the helix groove such that when the helix groove is rotated the drill bit is moved translationally; and
    a key pin in the support block which travels in the helix groove.

15. The drill as recited in claim 14 wherein a center of mass of the support block is substantially tangent to the helix screw.

16. The drill as recited in claim 15 wherein the helix groove includes a level section for locking the drill when the key pin is located in the level section.

17. The drill as recited in claim 16 wherein the level section is approximately four tenths of an inch in length.

18. The drill as recited in claim 17 wherein the helix groove has a pitch of approximately one inch.

* * * * *